United States Patent [19]
Ogburn et al.

[11] Patent Number: 4,628,885
[45] Date of Patent: Dec. 16, 1986

[54] CONTROL SYSTEM

[75] Inventors: Alan P. Ogburn, Cirencester; Ian J. Harvey, Cricklade, both of England

[73] Assignee: Lucas Industries Public Limited Company, Birmingham, England

[21] Appl. No.: 701,213

[22] Filed: Feb. 13, 1985

[30] Foreign Application Priority Data

Mar. 10, 1984 [GB] United Kingdom ............... 8406331

[51] Int. Cl.[4] ............................................. F02M 51/00
[52] U.S. Cl. ................................. 123/490; 361/152
[58] Field of Search .............. 123/438, 445, 458, 478, 123/480, 490, 499, 510; 361/152

[56] References Cited

U.S. PATENT DOCUMENTS

| | | | |
|---|---|---|---|
| 4,051,817 | 10/1977 | Hattori et al. | 123/490 |
| 4,358,812 | 11/1982 | Lo Cascio et al. | 123/490 X |
| 4,377,144 | 3/1983 | Takahashi | 123/490 |
| 4,438,496 | 3/1984 | Ohie | 123/478 X |
| 4,452,210 | 6/1984 | Sasayama et al. | 123/490 |
| 4,492,913 | 1/1985 | Arnold et al. | 123/490 X |
| 4,511,945 | 4/1985 | Nielson | 123/490 X |

Primary Examiner—Willis R. Wolfe, Jr.

[57] ABSTRACT

An electronic control system for a solenoid based actuator for a fuel system of an engine includes a switchable transistor connected in a series circuit with a current sensing resistor and the solenoid of the actuator. A power circuit supplies switching pulses to the transistor through an AND gate. A control circuit supplies a control signal to the power circuit and also a trigger signal to a monostable circuit. The monostable circuit supplies an enable signal to the AND gate. The control circuit receives a feedback signal from the sensing resistor and as long as this lies within prescribed limits the control circuit will supply the control signal and the trigger signal. If the feedback signal lies outside the prescribed limits at least the trigger signal will be halted so that after the time period of the monostable circuit has lapsed the transistor will receive no further switching pulses. A fuse is connected in series with the solenoid which will blow in the event that the solenoid remains energized for longer than a prescribed time.

7 Claims, 1 Drawing Figure

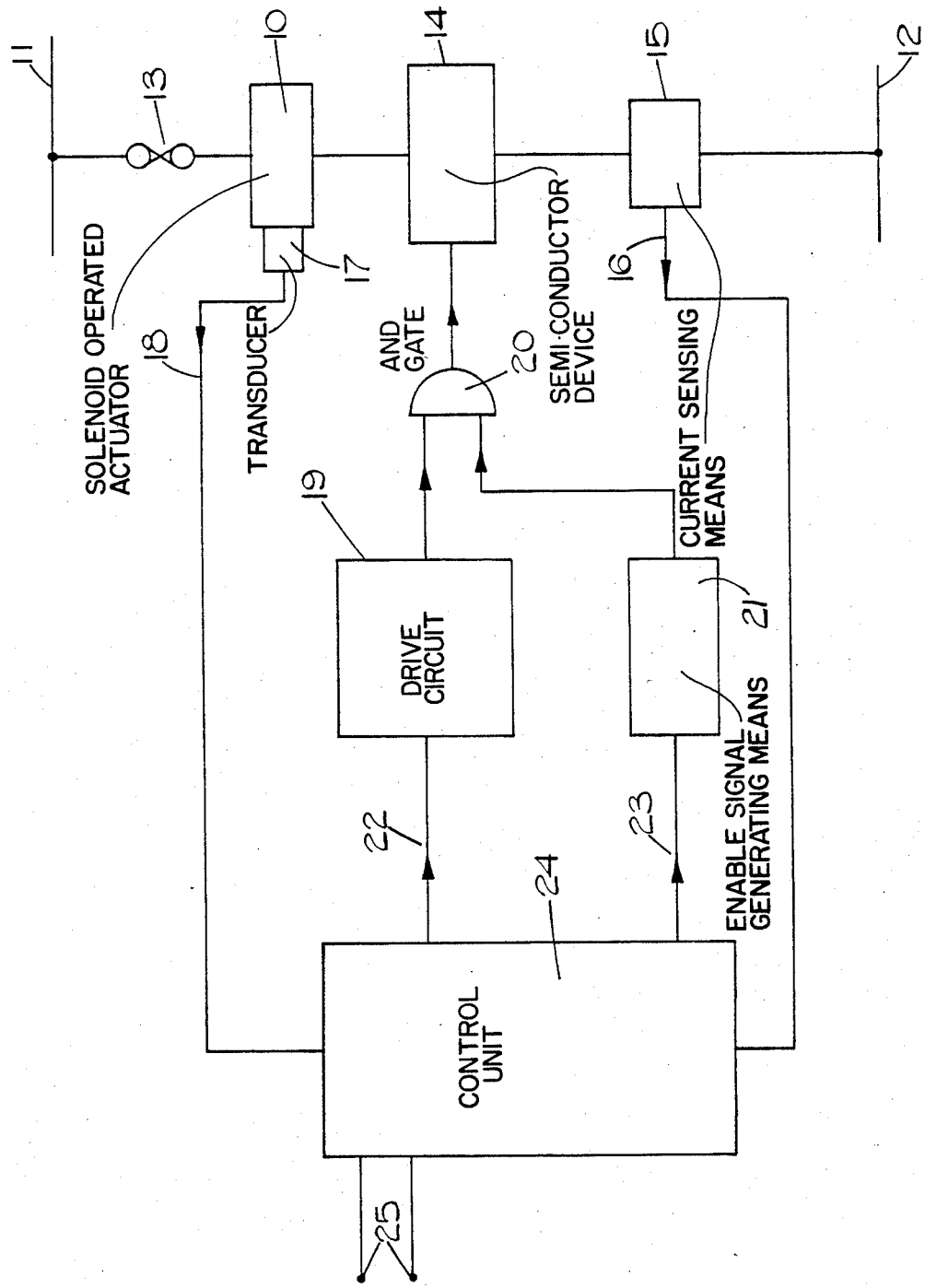

CONTROL SYSTEM

This invention relates to an electronic control system for a solenoid operated actuator of a fuel system of an internal combustion engine.

The aforesaid actuator may operate a valve which determines the amount of fuel which is supplied to an engine or it may control the setting of a control member which itself determines the amount of fuel supplied to the engine. For safety purposes it is arranged that when the current flowing in the solenoid is below a so-called holding value, the part which is actuated by the actuator assumes a position in which the amount of fuel supplied to the engine is either zero or has a low value such that no damage can occur to the engine and whatever is driven by the engine.

The control system will include a semi-conductor device connected in series with the solenoid across a source of supply and it is well established practice to switch the device on and off to control the mean current flow in the solenoid. In such a system a fuse or other current flow interrupting element would be provided in circuit with the solenoid, the rating of the fuse being such that if for example, the device fails to switch off, the fuse will blow and thereby deenergise the solenoid. While the fuse can adequately perform the duty assigned to it, it is undesirable that it should be called upon to interrupt the supply of current to the solenoid every time a fault occurs in the control system and in any case, faults may occur in the control which do not necessarily result in the device being rendered permanently conductive.

The object of the present invention is to provide an electronic control system in a simple and convenient form.

According to the invention an electronic control system of the kind specified comprises a semi-conductor device arranged in use to be connected in a series circuit with the solenoid of the actuator across a source of electric supply, feedback means for providing a feedback signal or signals indicative of an operating parameters or parameters of said actuator, a drive circuit for said semi-conductor device, said drive circuit having a control signal input to which can be applied a control pulse, the output of said drive circuit being a series of pulses whereby the semi-conductor device will be switched on and off to control the current flow in said solenoid, circuit means disposed intermediate said drive circuit and said semi-conductor device and which when an enable signal is applied thereto, passes said series of pulses to the semi-conductor device, enable signal generating means for generating said enable signal of predetermined time duration and an electronic control unit which receives said feedback signal or signals and supplies said control pulse to the drive circuit and a trigger signal to said enable signal generating means, the control unit receiving other signals so that it can determine and control the amount of fuel to be supplied to the engine, the control unit acting in the event of an internal fault or in the event that said feedback signal or signals fall outside prescribed limits, to discontinue the supply at least of the trigger signal to said enable signal generating means whereby the supply of said series of switching pulses to the semi-conductor device will be halted.

An example of a control system in accordance with the invention will now be described with reference to the accompanying drawing which shows a block circuit diagram.

Referring to the drawing there is shown a solenoid operated actuator 10 the output member of which, in one example, is coupled to a spill valve member of a fuel pumping apparatus of an internal combustion engine. When the solenoid of the actuator is energised the valve assumes a closed position so that fuel is supplied to the associated engine. The valve is actuated in timed relationship with the associated engine.

The solenoid is connected across a pair of d.c. supply lines 11, 12 in a series circuit which includes a current flow interrupting element such as a fuse 13, a semi-conductor device 14 which may be a field effect transistor, and current sensing means 15. The latter can comprise a resistor through which current flows to the solenoid and an amplifier which produces a first feedback signal 16 the magnitude of which depends upon the magnitude of one operating parameter i.e. the current flowing in the solenoid. In addition, the actuator has associated with it, a transducer 17 which provides a second feedback signal 18 the magnitude of which provides an indication of another operating parameter i.e. the position of the output member of the actuator.

The semi-conductor device 14 is driven by a drive circuit 19 and provides a series of pulses which switch the semi-conductor device on and off. The series of pulses are supplied to one input of the circuit means 20 shown as an AND gate the output of which is connected to a control terminal of the semi-conductor device. The other input of the circuit means 20 is connected to the output of an enable signal generating means 21 which conveniently is a monostable circuit having a predetermined period.

The drive circuit 19 provides the aforesaid series of pulses at its output, upon receipt of a control signal 22 at its input and this control signal together with a pulsed trigger signal 23 which is supplied to the monostable circuit 21 by a control unit 24. The feedback signals 16 and 18 are supplied to the control unit and the latter receives other input signals at terminals 25, these signals providing an indication of the demand placed upon the associated engine by the operator, the speed of the associated engine and a signal or signals indicative of the position of the rotary parts of the engine. Other signals may also be supplied. On the basis of the input signals applied to the terminals 25, the control unit, which conveniently is microprocessor based, supplies the control signal 22 at the correct time to enable fuel delivery to take place to the associated engine. It also supplies the trigger signal 23 and when these two signals are present, the semi-conductor device 14 is switched on and off under the control of the drive circuit 19.

The trigger signal 23 comprises a series of signals and there may be a number of such signals during the time duration of the control signal 22.

The control unit 24 examines the feedback signals 16 and 18 and, in the event that these fall outside prescribed limiting values, discontinues the supply of the trigger signal 23. The monostable circuit will after its time period remove the enable signal from the circuit means 20 so that the semi-conductor device 14 will be rendered not conductive. In the event that the control unit itself ceases to function correctly it will probably fail to provide both the control signal 22 and the signal 23 so that the semi-conductor device 14 is rendered not conductive.

A fault could occur such that the enable signal is applied to the circuit means 20 due for example to a fault in the monostable circuit 21. The possibility of such a fault remaining undetected is taken care of by arranging that at convenient times, for example when the engine is started, the control unit checks the system. For example, the control signal 22 can be supplied but not the trigger signal 23. A check can then be made to ensure that there is no current flowing in the solenoid by examining the feedback signal 16. If then a trigger signal is supplied the feedback signal 16 should indicate solenoid current and this should cease when the time period of the circuit 21 has lapsed. If this check sequence fails the control unit 24 can prevent the further supply of the control signal 22 to the circuit 19.

The check can be carried out in the reverse manner i.e. with no control signal 22 the trigger signal 23 is supplied and a check made to see if the current in the solenoid is zero. If current flow does take place further operation of the system is prevented. If the current is zero then the control signal 22 is supplied to the drive circuit which should result in current flow in the solenoid. If there is no current flow further operation of the system is prevented but if there is current flow a final check is made to ensure that the solenoid current reduces to zero when the time period of the monostable 21 lapses. If the current does not reduce to zero then it is preferable that the system should not be allowed to operate.

The fuse 13 is rated so that in the event of failure of the semi-conductor device 14 in the short circuit situation, it will blow after a predetermined time and a fault may occur in the drive circuit 19 which results in the semi-conductor device being turned on permanently. This should be noted by the control unit during its examination of the feedback signal 16. The control unit if it detects that the feedback signal is above a predetermined value, will halt the supply of trigger signals but the monostable circuit 21 will continue to provide the enable signal until its time period has lapsed. The fuse 13 can blow before the expiry of the time period.

We claim:

1. An electronic control system for a solenoid operated actuator of a fuel system of an internal combustion engine comprising a semi-conductor device arranged in use to be connected in a series circuit with the solenoid of the actuator across a source of electric supply to control current flow in the solenoid, a feedback means for providing a feedback signal indicative of an operating parameter of said actuator, a drive circuit for said semi-conductor device, said drive circuit having a control signal input to which can be applied a control pulse, said drive circuit producing a series of pulses whereby the semi-conductor device will be switched on and off to control the current flow in said solenoid, an AND gate disposed intermediate said drive circuit and said semi-conductor device and which when an enable signal is applied thereto, passes said series of pulses to the semi-conductor device, enable signal generating means for generating said enable signal of predetermined time duration and an electronic control unit which receives said feedback signal and supplies said control pulse to the drive circuit and a trigger signal to said enable signal generating means, the control unit receiving other signals so that it can determine and control an amount of fuel to be supplied to the engine, the control unit acting in the event of an internal fault or in the event that said feedback signal falls outside prescribed limits, to discontinue supply at least of the trigger signal to said enable signal generating means whereby supply of said series of switching pulses to the semi-conductor device will be halted.

2. An electronic control system for a solenoid operated actuator of a fuel system of an internal combustion engine comprising a semi-conductor device arranged in use to be connected in a series circuit with the solenoid of the actuator across a source of electric supply to control current flow in the solenoid, a feedback means for providing a feedback signal indicative of an operating parameter of said actuator, a drive circuit for said semi-conductor device, said drive circuit having a control signal input to which can be applied a control pulse, said drive circuit producing a series of pulses whereby the semi-conductor device will be switched on and off to control the current flow in said solenoid, circuit means disposed intermediate said drive circuit and said semi-conductor device and which when an enable signal is applied thereto, passes said series of pulses to the semi-conductor device, enable signal generating means for generating said enable signal of predetermined time duration and an electronic control unit which receives said feedback signal and supplies said control pulse to the drive circuit and a trigger signal to said enable signal generating means, the control unit receiving other signals so that it can determine and control an amount of fuel to be supplied to the engine, the control unit acting in the event of an internal fault or in the event that said feedback signal falls outside prescribed limits, to discontinue supply at least of the trigger signal to said enable signal generating means whereby supply of said series of switching pulses to the semi-conductor device will be halted.

3. A control system according to claim 2 in which said enable signal generating means comprises a monostable circuit.

4. A control system according to claim 2 in which said electronic control unit includes a microprocessor.

5. A control system according to claim 2 in which said feedback means comprises a current sensing resistor connected into said series circuit.

6. A control system according to claim 5 in which said feedback means further comprises a transducer responsive to the movement of a part of the actuator.

7. A control system according to claim 2 or claim 1 including a fuse connected in series with said series circuit.

* * * * *